United States Patent [19]

Morgan

[11] Patent Number: 4,529,578
[45] Date of Patent: * Jul. 16, 1985

[54] PRODUCTION OF CALCIUM HYPOCHLORITE

[75] Inventor: David L. Morgan, Glenhazel, South Africa

[73] Assignee: Klipfontein Organic Products Corporation Limited, Transvaal, South Africa

[*] Notice: The portion of the term of this patent subsequent to Feb. 19, 2002 has been disclaimed.

[21] Appl. No.: 532,138

[22] Filed: Sep. 14, 1983

Related U.S. Application Data

[63] Continuation of Ser. No. 459,726, Jan. 20, 1983, abandoned, which is a continuation of Ser. No. 356,536, Mar. 9, 1982, abandoned.

[30] Foreign Application Priority Data

Mar. 9, 1981 [ZA] South Africa .................. 81/1549

[51] Int. Cl.$^3$ .................................................. C01B 11/06
[52] U.S. Cl. .............................................................. 423/474
[58] Field of Search ........................................... 423/474

[56] References Cited

U.S. PATENT DOCUMENTS

| | | | |
|---|---|---|---|
| 1,937,230 | 11/1933 | Kitchen | 423/474 |
| 2,441,337 | 5/1946 | Spauer | 423/474 |
| 3,760,064 | 9/1973 | Droste | 423/474 |
| 3,895,099 | 7/1975 | Sakowski | 423/474 |
| 4,367,209 | 1/1983 | Sakowski et al. | 423/474 |
| 4,416,864 | 11/1983 | Wojtowicz | 423/474 |

Primary Examiner—Helen M. McCarthy
Assistant Examiner—Steven Capella
Attorney, Agent, or Firm—Beveridge, DeGrandi & Weilacher

[57] ABSTRACT

Crystals of dibasic calcium hypochlorite are produced by reacting lime with a solution containing hypochlorite ions under conditions suitable to produce large crystals of dibasic calcium hypochlorite, a mother liquor and fine insoluble impurities and separating the large dibasic calcium hypochlorite crystals from the mother liquor and insoluble impurities.

4 Claims, 1 Drawing Figure

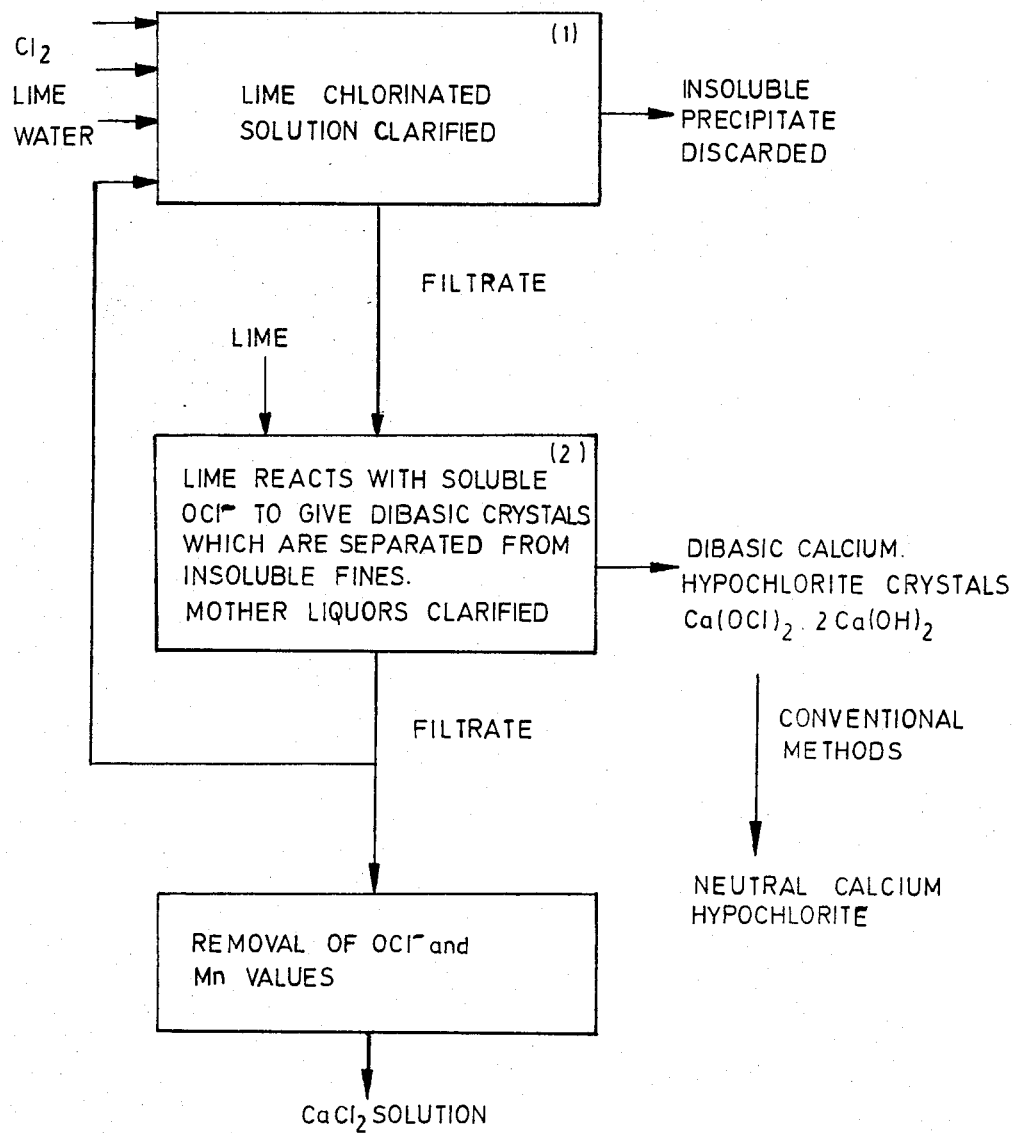

PRODUCTION OF CALCIUM HYPOCHLORITE

REFERENCE TO A RELATED APPLICATION

This is a continuation of my copending application Ser. No. 459,726 filed Jan. 20, 1983, now abandoned, which in turn is a continuation of my copending application Ser. No. 356,536 filed Mar. 9, 1982, now abandoned, which are both relied on herein This invention relates to the production of calcium hypochlorite and more particularly to the production of dibasic calcium hypochlorite.

Neutral calcium hypochlorite ($Ca(OCl)_2$) is used extensively particularly for swimming pool sanitation. It is produced by chlorinating a high quality lime ($Ca(OH)_2$). The high quality lime which is used is expensive. The lime which is readily available is cheaper but is of a poor quality containing much iron, other heavy metals, manganese, silica, alumina and other impurities. The iron and other heavy metals encourage the decomposition of the final calcium hypochlorite product while the manganese causes unwanted colour contamination. Other impurities are deleterious because they dilute the calcium hypochlorite content in the final product and make the product slower to dissolve.

It is an object of the present invention to provide a method of making dibasic calcium hypochlorite of good quality from limes which may be of poor quality. The dibasic calcium hypochlorite can be converted into neutral calcium hypochlorite of high quality by methods known in the art.

According to the invention there is provided a method of making crystals of dibasic calcium hypochlorite ($Ca(OCl)_2.2Ca(OH)_2$) including the steps of reacting lime with a solution containing hypochlorite ions ($OCl^-$) to produce large crystals of dibasic calcium hypochlorite, a mother liquor and fine insoluble impurities; and separating the dibasic calcium hypochlorite crystals from the mother liquor and the insoluble impurities.

The lime which is used in this process may be of high quality or poor quality, but clearly the process has greater application for limes of poor quality. It has been found that dibasic calcium hypochlorite crystals can be produced wherein at least 80 percent of the original impurities in the starting lime have been removed.

The insoluble impurities will be finer than the crystals of dibasic calcium hypochlorite. Consequently, separation methods must be used which achieve separation of these two precipitates. These methods are known in the art and include wet size classification methods such as differential settling particularly against an upward flow of clarified mother liquor, hydrocyclone and centrifugal classifiers; flotation of the fine impurities; and filtration followed by drying and then dry classification methods such as sieving and air-classification. All these methods are well known in the art.

Large crystals of dibasic calcium hypochlorite are produced by methods such as seeding the medium with seed crystals or using a continuous process where seed crystals are continuously being produced. It is essential to the invention that large, easily separable, crystals of dibasic calcium hypochlorite be produced. This enables these crystals to be separated from the fine insoluble impurities. The dibasic calcium hypochlorite crystals so separated are of good quality and can be converted into neutral calcium hypochlorite crystals by methods and techniques well known in the art, e.g. chlorination aqueous medium.

The solution containing hypochlorite ions which is reacted with the lime is typically produced by chlorinating lime in the presence of water to produce a mother liquor and fine insoluble impurities and separating the impurities from the mother liquor. The chlorination may be achieved using any known chlorinating agent. The preferred chlorinating agent is chlorine gas.

The mother liquor or filtrate produced after separation of dibasic calcium hypochlorite crystals may be partially re-cycled to the chlorination step, and the remainder used to produce a calcium chloride solution. The mother liquor may be treated to remove dissolved hypochlorite and manganese values producing a relatively pure calcium chloride solution.

An embodiment of the invention will now be described with reference to the attached flowsheet shown in the FIGURE.

Referring to the flowsheet, the first step involves slurrying a poor quality lime with water and filtrate from a step further down the process and chlorinating the slurry. The solution, which is as concentrated as possible in dissolved hypochlorite, is filtered to remove insoluble precipitate which is discarded. The insoluble precipitate will contain all the major impurities except for manganese which remains in solution in the form of permanganate.

The filtrate is taken to step (2) where further lime is added and caused to react with the filtrate under conditions encouraging the growth of large crystals of dibasic calcium hypochlorite. As mentioned above such conditions include the use of seed crystals. The crystals of dibasic calcium hypochlorite are separated from the fine, gelatinous insoluble impurities which form using any of the methods mentioned above, filtered and washed with a little water. This water can be re-cycled to the first chlorination step.

The mother liquor is filtered to remove remaining insoluble impurities. The filtrate is divided into two parts—one part being re-cycled to the first chlorination step and the other part being treated to decompose the hypochlorite values and remove the dissolved manganese. The resulting solution is a calcium chloride solution. The concentration of the calcium chloride solution will depend on the amount of water which is added initially.

The crystals of dibasic calcium hypochlorite separated from the mother liquor in step (2) are of high purity, at least 80 percent of the impurities in the original lime having been removed. The crystals may contain a certain amount of manganese and this may be removed by washing the crystals.

The dibasic calcium hpochlorite crystals may thereafter be converted into neutral crystals of calcium hypochlorite using known methods and techniques.

An example of the invention will now be described. Reference is made in this Example to the flowsheet.

EXAMPLE

Lime (205 g) having an analysis
$Ca(OH)_2$: 96%
$CaCO_3$: 1%
$SiO_2$: 1.6%
Mg: 0.5%
Mn: 0.28%
Fe: 0.21%
Al: :0.15% was slurried up with solution (700 g) containing 4,1% by weight dissolved calcium hypochlorite and 20% by weight calcium chloride and water (500 g). The calcium hypochlorite/calcium chloride solution was obtained after filtering the dibasic calcium hypochlorite crystals in step (2) (see flowsheet). Chlorination was continued to the point where the Ca(OH)$_2$ concentration was about 0,5% and the solution filtered. The filtrate was essentially free of impurities except manganese, which was present as permanganate.

The same lime (205 g) was added to the filtrate in the presence of seed crystals encouraging the growth of large crystals of dibasic calcium hypochlorite. These large crystals were separated from the fine insoluble precipitate present by differential settling against an upward flow of mother liquor, and filtration, washed with a little water to give a product composition Ca(OH)$_2$: 25%
Ca(OCl)$_2$: 26%
CaCl$_2$: 4%
SiO$_2$: 0.04%
Mg: 0.02%
Mn: 0.002%
Fe: 0.01%
Al: 0.01%

This demonstrates an overall purification of about 90%.

I claim:

1. A method of making crystals of dibasic calcium hypochlorite including the steps of reacting lime which contains impurities including iron, other heavy metals, manganese, silica and alumina, with a solution containing hypochlorite ions, in the presence of seed crystals, whereby crystals of dibasic calcium hypochlorite are produced together with mother liquor and fine insoluble impurities in a slurry, the crystals of dibasic calcium hypochlorite being large and easily separable, thereby enabling said crystals to be separated from the fine insoluble impurities that are finer than the large crystals of dibasic calcium hypochlorite, separating the large dibasic calcium hypochlorite crystals from the mother liquor and also separating the large dibasic calcium hypochlorite crystals from the fine insoluble impurities, and without treating the slurry at any stage so obtained to precipitate out the iron impurities.

2. A method according to claim 1 wherein the solution containing hypochlorite ions is mother liquor produced by chlorinating lime in the presence of water to produce a mother liquor and fine insoluble impurities and separating the mother liquor from the impurities.

3. A method according to claim 2 wherein chlorination is achieved with chlorine gas.

4. A method according to claim 1 which includes the step of converting the dibasic calcium hypochlorite into neutral calcium hypochlorite.

* * * * *